Oct. 22, 1963

R. T. DRAKE 3,107,946

RESILIENT BEARING MOUNT

Filed Oct. 16, 1958

INVENTOR.
ROBERT T. DRAKE

BY

*Eber J. Hyde*

ATTORNEY

Oct. 22, 1963    R. T. DRAKE    3,107,946
RESILIENT BEARING MOUNT
Filed Oct. 16, 1958    2 Sheets-Sheet 2

INVENTOR.
ROBERT T. DRAKE
BY
*Elver J. Hyde*
ATTORNEY 3,107,946
RESILIENT BEARING MOUNT
Robert T. Drake, Parma, Ohio, assignor to Clevite Harris Products, Inc., Milan, Ohio, a corporation of Ohio
Filed Oct. 16, 1958, Ser. No. 767,533
3 Claims. (Cl. 308—8)

This invention pertains to a resilient bearing mount.

Generally in the application of frictionless and other precision type metal bearings, it is required that very close tolerances be maintained between the outer diameter of the bearing and the internal diameter of the bore within which the bearing is installed. These tolerances commonly run on the order of a few ten-thousandths of an inch. Further, the bearing must be pressed into the bore with an interference fit and a substantial amount of fairly expensive equipment must be used, and care must be exercised to assure exact alignment during the pressing operation. The precision machining, the equipment involved and the skill required of the operator all combine to increase the cost of the installed bearing.

The present invention provides a resilient bearing mount or liner, made of rubber or the like, which is installed between the outer diameter (O.D.) of the bearing and the internal diameter (I.D.) of the bore within which the bearing fits. This bearing liner may be easily slipped into the bore, and after the bearing is inserted is in tight frictional engagement with both the I.D. and O.D. surfaces. Because of its resilience it greatly opens up the tolerances which must be held on the bore and on the O.D. of the bearing. Also, it greatly simplifies the assembly of the parts since tolerances are not nearly so critical, consequently less powerful and expensive assembly equipment can be used, the operator need not be highly skilled, and, since the liner may be inserted into the bore by the operator's fingers faster assembly is obtained with less danger of damage to parts.

Tolerance relaxation may be to the extent that the device of the present invention can be inserted by hand in a tapered bore such as is found in die-cast parts. When applied to a die-cast part having a tapered bore the resiliency of the unit and its ability to compensate for the taper permit the use of die-cast parts where previously they were unsuitable.

It is, therefore, an object of my invention to provide a resilient bearing liner which facilitates and makes less expensive the assembly of bearings, and at the same time to provide a device which is self-aligning, which will isolate shocks and sound vibration between parts, and which will accommodate a relatively large amount of misalignment between parts.

A further object of the invention is to provide a bearing liner whose tolerances need not be closely held; the liner being adapted for installation in a bearing assembly. Because of the liner, the bearing tolerances need not be closely held, thereby permitting the bearing cost to be reduced.

An object of the invention is to provide a yieldable bearing mount which effectively reduces transmission of shocks and vibrations, and which reduces the cost of an assembled device because its use permits much wider tolerances in adjacent parts.

Still another object of the invention is to provide a bearing installation having a resilient liner or mount between the outer race of the bearing and the housing within which it is mounted, whereby to greatly open up the manufacturing tolerances of the bearing and housing parts.

For a better understanding of the present invention, together with other and further objects thereof, reference is had to the following description taken in connection with the accompanying drawings, and its scope will be pointed out in the appended claims.

With reference to the drawings there is shown at FIGURE 1 a transverse sectional view of the bearing liner of this invention.

An aspect of the present invention lies in the provision of a resilient bearing liner comprising a split metal outer sleeve and an annular rubber sleeve adhered to the inner surface of the split metal sleeve.

Another aspect of the invention lies in the provision of a bearing installation, and the method of making same, wherein bearing means are mounted around a shaft for relative rotation therebetween. A rubber-like sleeve is mounted around the bearing means and is in frictional engagement therewith effective to prevent substantial rotary movement between the bearing and the sleeve. A split outer sleeve of material harder than the rubber is around the outside of the rubber-like sleeve, and there is a housing having a bore within which the split metal sleeve is mounted. In the assembly of the device the sub-assembly comprised of the split back and the rubber-like sleeve usually are slipped by hand into the housing bore with substantially no interference fit, and thereafter when the bearing and shaft are forced into place high frictional forces are set up between the split sleeve and the housing due to the radial expansion of the rubber-like sleeve and the split sleeve.

Figure 1:
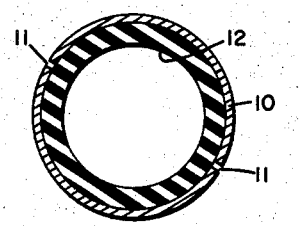
Figure 2:
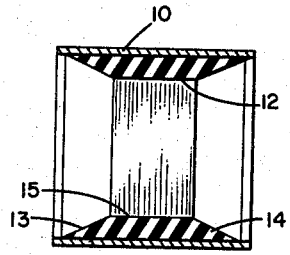
FIGURE 2 is a longitudinal sectional view of the device shown in FIGURE 1.

With reference to FIGURES 1 and 2 there is shown the resilient bearing liner comprised of a metal sleeve 10 which is split at one or more locations 11 to provide for limited circumferential expansion and contraction of the metal sleeve 10. Within the metal sleeve 10 and adhered to it throughout its outer face is an annular rubber-like sleeve 12, preferably formed of natural or artificial rubber. Other rubber-like materials may also be used, the important characteristics being the elasticity of the material and its ability to frictionally hold an internal bearing member when the rubber sleeve is substantially deformed and elongated by the forceful insertion of the internal bearing member.

It is to be appreciated that the rubber-like material is virtually incompressible, and that as the internal bearing member is inserted with substantial interference fit the rubber-like material is subjected to substantial deformation, and frictionally holds the bearing member by its tendency to return to its original state. Because of this characteristic the rubber-like sleeve member 12 may be tapered at both ends 13 and 14, thereby facilitating insertion of the bearing member and providing space for the thicker central portion 15 to flow under compressional forces.

Figure 3:
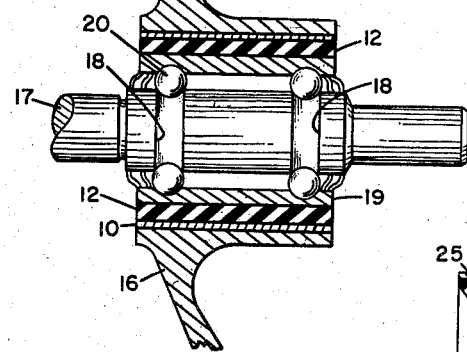
FIGURE 3 is a sectional view showing the bearing liner installed in a typical bearing assembly.

The resilient bearing liner shown in FIGURES 1 and 2 is inserted into a metal housing 16, as shown in FIGURE 3, the insertion therein preferably being without substantial interference fit so that the operator may do it by hand. Because of the split 11 close tolerances between the internal diameter (I.D.) of the housing 16 and the outer diameter (O.D.) of the sleeve member 10 are not required. Thus the housing 16 may be bored by less costly machining methods and costly inspection and quality control steps greatly reduced, while the metal sleeve 10 need only be a stamping with reasonable tolerances. Preferably the outer sleeve 10 has closed butt joints at 11, however it is within the scope of the invention for the joints 11 to be slightly open so that upon insertion there is a slight closing of the gaps 11. Thereafter the tendency of the rubber-like material 12 to expand causes the subassembly 10-12 to remain in the housing bore during further handling necessary in assembly.

After the resilient bearing liner 10, 12 is inserted in the housing 16, a bearing member is inserted within the resilient bearing liner.

The bearing member may be comprised of a shaft 17 having spaced apart bearing grooves 18 circumferentially around it, an outer bearing race member 19 spaced around the shaft 17 and ball bearing means 20 or the like between the shaft 17 and the outer race member 19; or sleeve, needle or roller bearing devices may be used.

As the bearing member is inserted in the resilient bearing liner the rubber-like material is compressed radially causing the central portion 15 thereof to flow axially to the tapered ends 13, 14, resulting in an assembled device with a rubber-like wall of uniform thickness throughout its length. The radially directed outward forces created by the deformation of the rubber-like material cause the splits 11 in the metal sleeve 10 to open up, forcing the sleeve into close frictional engagement with the metal housing member 16. The inclined ends 13, 14 of the rubber-like sleeve member greatly facilitate the insertion of the bearing member; also, the bearing member may be lubricated with suitable lubricants which subsequently are absorbed into the rubber to create high frictional forces, as is well known in the art. This also means that the outer diameter of the outer bearing race 19 need not be held to close tolerances.

Of major importance in reducing the cost of parts and the cost of assembly is the fact that a limited though fairly wide degree of misalignment may be compensated for by the flow of the rubber-like material. Consequently, it will be seen that the use of the inexpensive resilient bearing liner permits the use of a less expensive bearing member and permits wider housing tolerances, reducing the cost of the housing 16.

Experience has shown that this resilient bearing liner permits the use of tolerances of the order of .030" in installations where previously tolerances not to exceed about .003" were required. Those familiar with the cost of maintaining production tolerances will appreciate the savings involved in a ten-fold opening thereof.

In addition, the resilient bearing liner provides for shock absorption and noise and vibration isolation right at the bearing. Thus, in a washing machine installation, the bearing noise is prevented from reaching large metal parts, such as tubs and the like, which would vibrate and amplify the noise.

Figure 4:
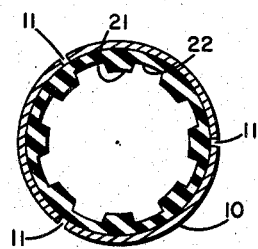
FIGURE 4 is a transverse sectional view showing a modified form of the invention wherein the rubber sleeve is axially corrugated.

FIGURE 4 is a sectional view transverse to the longitudinal axis of a modified unit, showing the sleeve 10 split at one or more locations 11, as previously described, wherein the resilient member 20 has a corrugated internal face 21. The corrugations 22 extend lengthwise of the unit and are particularly useful where the axial length of the bearing unit is long compared to the diameter of the unit. In such installations the corrugations 22 provide space for the circumferential displacement of the rubber-like material. Such a configuration simplifies proper displacement of the rubber-like material yet provides adequate rubber wall compression. This unit may be called an axially corrugated device.

Figure 5:
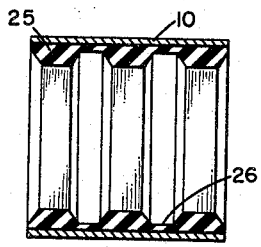
FIGURE 5 is a longitudinal sectional view showing a circumferentially corrugated rubber sleeve unit.

FIGURE 5 is a sectional view taken along the axis of a modified unit, showing the split sleeve 10, and within the sleeve showing a rubber-like member 25 which is corrugated circumferentially by corrugations 26. This device also is of primary use where the bearing unit is long compared to its diameter, and may be called a circumferentially corrugated device.

Figure 6:
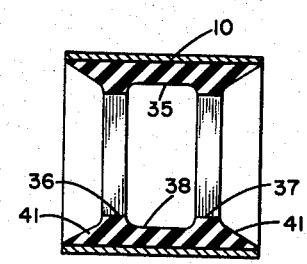
FIGURE 6 is a longitudinal sectional view of a modified resilient bearing mount especially adapted for long bearing units.

FIGURE 6 shows, by a longitudinal section, still another modification, particularly useful for long bearing units, wherein the split sleeve 10 has adhered to its internal face two or more relatively thick rubber-like sleeve members 30, 31, connected together by a relatively thin intermediate portion 32. In one respect this unit is somewhat similar to the aforedescribed circumferentially corrugated unit.

Figure 7:
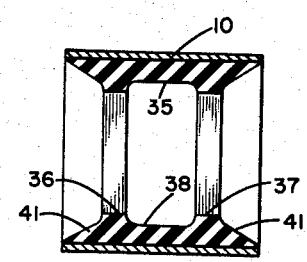
FIGURE 7 is a sectional view showing a modified bearing mount.
Figure 8:
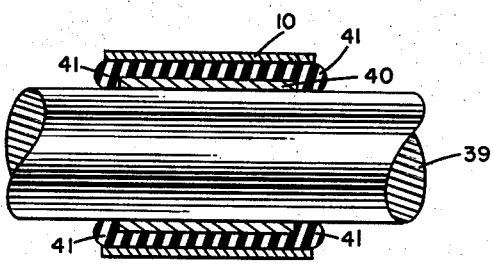
FIGURE 8 shows the mount of FIGURE 7 assembled on a shaft with a sleeve type bearing in position.

FIGURES 7 and 8 show a modified device wherein the bearing mount, as aforedescribed, is comprised of a hard, split outer sleeve 10 within which there is adhered a rubber-like sleeve member 35. The sleeve member 35, in its unassembled condition, has two spaced-apart end portions 36, 37 whose internal diameter is less than the internal diameter of the central portion 38, and is less than the diameter of the bearing unit to be inserted therein. When assembled on a bearing 40 and a shaft 39, as shown in FIGURE 8, the displacement of the rubber-like portions 36, 37 is such that it causes the previously tapered ends 41 to bulge inwardly against the shaft 39, forming seals around each end of the bearing 40. Thus the bearing is protected from dust and dirt, and if the bearing is of the self lubricating type the seal helps to retain the lubricant in the assembly and the life of the bearing is prolonged.

Figure 9:
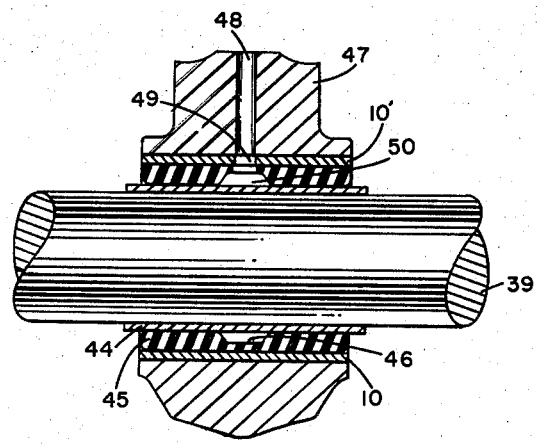
FIGURE 9 is a longitudinal sectional view showing still another modification wherein the bearing unit may be oiled through the resilient mount.

In the event the bearing device requires periodic lubrication, a configuration such as shown in FIGURE 9 is provided. The sleeve bearing 44 may be of sintered material so that it is porous, or it may have oil passageways through or around it. Around the bearing 44 is the bearing mount comprised of the split sleeve 10' and a rubber-like sleeve 45 having a relieved or thin central portion 46. The bearing and bearing mount are assembled in a housing 47 which has an oil hole 48 extending to a hole 49 through the sleeve member 10'. The rubber-like sleeve 45 has an annular groove 50 aligned with the oil holes 48, 49 in the housing and in the outer sleeve member. Thus oil applied to the oil hole 48 will lubricate the bearing 44.

In the event the bearing 44 is non-porous, an oil hole may be provided extending through it to the surface of the shaft 39, and grooves may be provided in the internal diameter of the bearing 44 for distributing the oil.

The annular groove 50 may be used for storage of lubricating material, with and without the provision of means for adding more lubricating material, and end seals such as those shown in FIGURE 8 may be used to keep the lubricant within the device shown in FIGURE 9.

Figure 10:
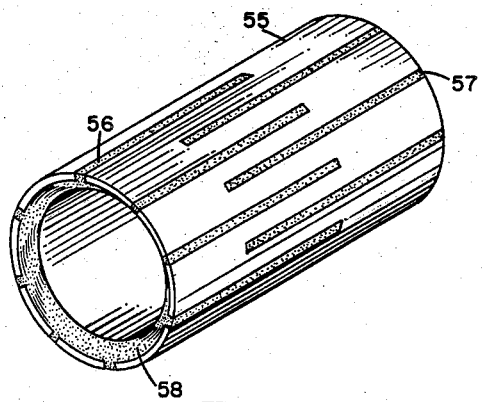
FIGURE 10 is an isometric view showing a modified type of metal sleeve for the resilient mount wherein a plurality of slots are employed.

In the aforedescribed embodiments the sleeve of the bearing mounting device has been described as having one or more axial slots 11 which extend the length of the unit. FIGURE 10 is an isometric view of a modified sleeve 55 which may be used in any of the aforesaid devices. As shown in FIGURE 10 the sleeve device 55 has longitudinal slots 56 extending into it from one end and slots 57 extending into it from the other end thereby providing a unitary outer sleeve device 55 which is sufficiently flexible that it will readily expand circumferentially as the rubber sleeve 58 within it is distorted by the insertion of a bearing.

Figure 11:
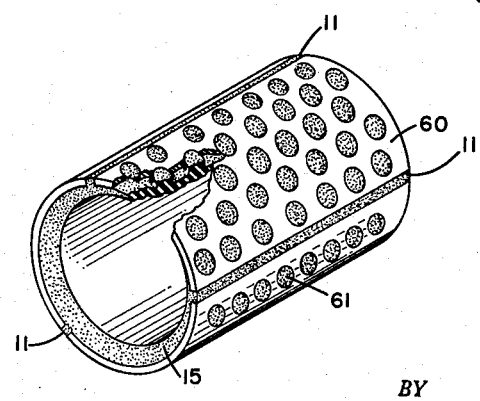
FIGURE 11 is an isometric view showing still another type of metal sleeve for a resilient mount wherein a plurality of holes are utilized in conjunction with one or more slots.

FIGURE 11 is an isometric view of a resilient bearing mount having a firm outside shell member 60 and a resilient or deformable rubber-like inner sleeve member 15 adhered or otherwise held to the inside surface thereof. The outer sleeve 60 is split at one or more locations 11, and in addition thereto there are a plurality of holes 61 through the outer sleeve member. The inner sleeve member 15 preferably is made of rubber, and when it is bonded within the sleeve 60 the material flows through the slots 11 and through the holes 61 to the outside surface of the unit. Thus when the resilient bearing mount is mounted in a bore, and a bearing unit assembled as aforedescribed, there is increased friction between the inside surface of the bore and the outside surface of the mounting unit due to increased area of rubber in contact with the bore.

While the drawings show cylindrical devices in which the rubber-like sleeve is held, it is to be understood that the present invention is not to be limited thereto since hexagonal outer sleeve members may be used to prevent their rotation in a bore, or other external shapes may be used.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A bearing installation comprising a shaft, bearing means around said shaft for relative rotation therebetween, a rubber-like sleeve around said bearing means and in frictional engagement therewith effective to prevent substantial rotary movement between a portion of said bearing and said rubber-like sleeve, a slotted outer sleeve of material harder than said rubber around the outside of said rubber-like sleeve, and a housing having a bore within which said split outer sleeve is mounted with said split outer sleeve in frictional engagement with the bore of said housing, the split metal sleeve being expanded into said frictional engagement by the insertion of said bearing member within said rubber-like sleeve, the material of said rubber-like sleeve substantially filling said slot and engaging the wall of said bore, and the inner surface of said rubber-like sleeve being free of adhesive engagement with said bearing means.

2. A mounting device for resiliently mounting a shaft bearing means within a bore in a device, comprising; a rubber-like sleeve around and in close frictional engagement with a portion of said bearing means effective to prevent substantial rotary movement between said rubber-like sleeve and said portion of said bearing means, a split outer sleeve of material harder than the material of said rubber-like sleeve adhered around the outside of said rubber-like sleeve and in frictional engagement with the wall of said bore to prevent substantial rotary movement of said outer sleeve and said rubber-like sleeve in respect to said device, said split outer sleeve having a slot extending lengthwise thereof which closes as said sleeves are inserted into said bore and which opens as said bearing means are inserted into said rubber-like sleeve.

3. A mounting device for resiliently mounting a shaft bearing means having an outside sleeve within a bore in a device, comprising; a rubber-like sleeve around and adapted to be in close frictional engagement with the outside sleeve of said bearing means, and a split outer metal sleeve around and adhered to the outside surface of said rubber-like sleeve, said split defining a slot running axially of said metal sleeve when said mounting device comprised of said rubber-like sleeve and said metal sleeve is in its unassembled condition, said slot closing as said mounting device is forced into said bore and opening as said bearing means is subsequently forced into close frictional engagement with said rubber-like sleeve.

References Cited in the file of this patent

UNITED STATES PATENTS

| | | |
|---|---|---|
| 1,829,530 | Morris | Oct. 27, 1931 |
| 1,839,094 | Geyer | Dec. 29, 1931 |
| 1,919,375 | Maclachlan et al. | July 25, 1933 |
| 2,142,872 | Haushalter | Jan. 3, 1939 |
| 2,215,523 | Haushalter | Sept. 24, 1940 |
| 2,226,406 | Krotz | Dec. 24, 1940 |
| 2,477,221 | Von Bolhar | July 26, 1949 |
| 2,523,983 | Arms | Sept. 26, 1950 |
| 2,606,795 | Hutton | Aug. 12, 1952 |
| 2,618,520 | Anderson et al. | Nov. 18, 1952 |
| 2,778,664 | Herbenar | Jan. 22, 1957 |